United States Patent [19]

Salter

[11] 4,048,898
[45] Sept. 20, 1977

[54] FASTENER FOR MULTI METAL STACK-UPS

[75] Inventor: Larry Salter, Lakewood, Calif.

[73] Assignee: Paul R. Briles, Inglewood, Calif. ; a part interest

[21] Appl. No.: 727,800

[22] Filed: Sept. 29, 1976

Related U.S. Application Data

[63] Continuation-in-part of Ser. No. 515,578, Oct. 17, 1974, abandoned.

[51] Int. Cl.[2] .............................................. F16B 13/06
[52] U.S. Cl. .......................................... 85/77; 29/446; 29/523; 85/1 R
[58] Field of Search ............ 85/77, 78, 1 R, 9 R, 85/37, 39; 151/41.74, 41.73; 403/297; 29/446, 523

[56] References Cited

U.S. PATENT DOCUMENTS

| | | | |
|---|---|---|---|
| 2,525,117 | 10/1950 | Campbell | 85/77 |
| 3,034,611 | 5/1962 | Zenzic | 85/1 R X |
| 3,270,410 | 9/1966 | Salter et al. | 29/446 |
| 3,271,058 | 9/1966 | Anderson | 151/41.74 X |
| 3,298,725 | 1/1967 | Boteler | 85/1 R X |
| 3,515,419 | 6/1970 | Baugh | 85/39 X |
| 3,603,626 | 9/1971 | Whiteside | 85/85 X |
| 3,641,865 | 2/1972 | Swinot et al. | 85/7 |
| 3,693,247 | 9/1972 | Brown | 85/77 X |
| 3,747,467 | 7/1973 | Rosman | 85/37 |
| 3,835,615 | 9/1974 | King | 85/77 X |

FOREIGN PATENT DOCUMENTS

750,894   6/1956   United Kingdom ................. 85/9 R

*Primary Examiner*—Ramon S. Britts
*Attorney, Agent, or Firm*—Singer & Singer

[57] ABSTRACT

A fastener, primarily of the precision type for aircraft use in holding together multiple metal stack-ups, makes use of a sleeve, a headed shaft and a nut. The shaft and sleeve as a subassembly is inserted in a hole in a stack-up of sheets, the nut is applied to the shaft and the shaft is drawn forceably into the passageway to expand the sleeve laterally into anchored engagement with the wall of the hole. The fastener is of special construction in that it is an installation formed fastener and sleeve assembly for fatigue critical aircraft structure where the combination of sheet, plate, forgings and other fastener assembly materials may vary in modulus of elasticity, hardness and other physical properties. The fastener assembly consists of a sleeve, a bolt, rivet or stud, and suitable means of retention such as a self locking nut or collar. The sleeve is partially formed and machined to final dimension while in place on the exact bolt which is ultimately used when completing the fastener assembly in place. A pre-designed and predictable assembly sizing and forming takes place by reason of elastic and plastic material flow between the fastener assembly and hole provided in the stack-up sheets of the aircraft structure, during final installation, to substantially eliminate any existing clearances. With the above described system it is possible to guarantee a specified degree of hole expansion within close limits when the bore diameter tolerance of the aircraft manufacture is known.

25 Claims, 25 Drawing Figures

DATA:
Sleeve bore and shaft taper rate = .250"/ft.

P = Position of sleeve measured in .000 from bearing surface of head provided user IP = Subassembly of sleeve and fastener prior to insertion and machining $$D(\text{Expanded}) = \frac{P \text{ in inches}}{\text{Taper in inches within } \pm .0005}$$

For example for a $\frac{1}{4}"$ per 12" of taper is $\frac{12"}{.25"} = 48$ $D = \frac{P}{48}$  hence: D expands .001 for each .048 reduction in P

FASTENER FOR MULTI METAL STACK-UPS

This is a continuation-in-part of patent application Ser. No. 515,578, filed Oct. 17, 1974 now abandoned.

Sundry expedients utilizing straight and tapered shank fasteners have been heretofore resorted to with varying degrees of success, for the purpose of fastening together multiple sheets of metal in fatigue critical aircraft structure.

Even though the exact dimensions may be specified for the individual fastener and holes are held within the tightest tolerances listed in current specifications, the benefits anticipated are often lost in the accumulative tolerances inherent to the most sophisticated piece by piece assembly systems. The fasteners used in the wet wing design of today's aircraft are possible sources of fuel leakage and are usually reinforced by additional additive sealant measures. In a wet wing there is no separate tank for fuel. It is therefore undesirable in what the industry terms an interference fastener fit system to have any inherent clearances which are subject to accumulating.

The problem cannot be solved by providing unlimited amount of interference fit in most aircraft applications without exceeding interference design maximum limits necessary to permit reasonable installation forces and avoid stress corrosion cracking where applicable.

Where, for example, a sleeve is secured in a hole, the term interference has been chosen to mean that the sleeve has been expanded to an outside diameter greater than the initial diameter of the hole thereby to force the metal forming the hole laterally outwardly and thereby anchor the sleeve in the hole. The term interference fit naturally applies also to bolts, nuts and other assemblies where a comparable action takes place.

In supplying precision type fasteners of the sort made reference to, some prior structures have resorted to making use of a tapered bore through the multiple layers for reception of the tapered shank of a bolt or rivet. Typical of such prior structure are Zenzic U.S Pat. No. 3,034,611 and Salter et al U.S. Pat. No. 3,270,410.

Although such structures have been widely used in the past and have been acceptable as providing a dependable fastening system in aircraft, the cost of a tapered hole type fastener in today's titanium-aluminum aircraft prohibits its consideration for use in many applications. Such holes can only be drilled by specially constructed drills requiring several subsequent reaming operations to achieve the required fastener-to-hole bearing requirements. When fasteners are replaced or holes re-drilled for oversize fasteners, a whole new series of oversize bolts, drills, reamers and gages are necessary. Oversize bolts are more costly and curtail the aircraft performances by adding considerable weight when used in large quantities.

When, for example, a fastener must be replaced, the hole is made bigger. This requires a larger fastener and since the bolt is a solid piece of material it weighs more than the smaller original bolt and the entire joint is then correspondingly heavier.

In recognizing the possible advantages of employing a cylindrical bore in the multiple layers, Anderson Patent 3271058 has made use of a sleeve of cylindrical form on the exterior and having a tapered passage through it. Such fasteners as have followed this principle have been such as to necessitate application of the fastener parts from opposite sides of the multi-layer stack and hence have presented installation problems. Other inherent weaknesses exist at the head of the bolt or fastener where rupture under vibration stress is most prevalent. Also piece by piece installation of the fastener parts tends to increase the undesired accumulation of tolerances.

It is commonly understood and appreciated that even when multiple layers of metallic material have a straight bore drilled through them, the bore will not always be perfectly concentric throughout its length, also because some metallic layers may be of different kinds of metal with different degrees of hardness, a drilled straight or tapered hole may readily not be consistent throughout its length, within acceptable tolerances.

One cause of the difference is the fact that the cutting tool cuts differently as it passes through the various layers of different metal such as titanium and aluminum. A difference of .002" is common for a stack-up of titanium and aluminum. It is also the fact that thickness of the metallic layers may vary slightly, some being thicker than normal and others thinner than normal and hence the length of the bore through the multiple layers will not be exactly the same on all occasions.

Since fasteners of the type here under consideration depend upon an interference fit, in other words expansion laterally into engagement with the wall of the bore, the expansion is controlled in the finished joint to provide interference levels within tight limits irrespective of variations in the materials used and dimensional tolerances of both the bore and the fastener.

It is, therefore, among the objects of the invention to provide a new and improved installation formed fastener for multilayer stack-ups which is simple in its construction, relatively light in weight, and which is capable of providing a controlled amount of expansion within specified customer limits under those conditions prevalent in installations of this kind. It is also intended to enable the semi-skilled mechanic at the various repair stations around the world to make installations approaching the quality of that achieved by the experts in the factory.

Another object of the invention is to provide a new and improved installation formed fastener and method of application which makes it possible to use a cylindrical bore through the mutliple metal layers and, by providing a subcombination or subassembly consisting of a tapered sleeve and a tapered bolt shank, expand the sleeve uniformly into engagement with the wall of the bore with expansion occurring to a sufficient degree to provide a joint within optimum design limits.

Still another object of the invention is to provide a new and improved installation formed fastener for multi-metal stack-ups which makes use of a two piece subcombination consisting of a tapered sleeve in a tapered shank and wherein the sleeve is slightly pre-formed so as to be handled as a unit for the purpose of eliminating accumulation tolerances, and also serving to minimize inventory problems and initial installation procedures.

Still another object of the invention is to provide an installation formed fastener for multi-metal stack-ups wherein the head of the fastener as well as the shank is so formed as to provide an interference fit thereby to assure uniform engagement with the multiple metal layers throughout all portions of engagement of the sleeve with the surrounding metal of the layers.

Further included among the objects of the invention is to provide a new and improved installation formed fastener wherein the amount of ultimate expansion of the sleeve is determined by the initial endwise protrusion of the shank from the sleeve, thereby assuring that all fasteners in a lot can be depended upon when installed to provide an acceptable connection.

With these and other objects in view, the invention consists of the construction, arrangement, and combination of the various parts of the device, whereby the objects contemplated are attained, as hereinafter set forth, pointed out in the appended claims and illustrated in the accompanying drawings.

Figure 1:
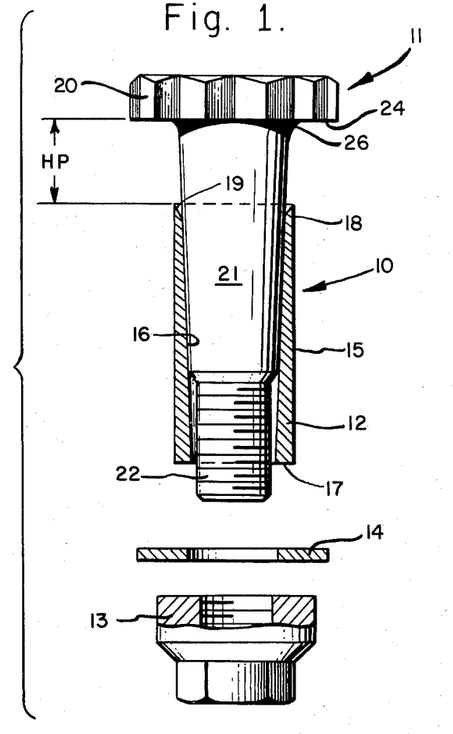
FIG. 1 is an exploded view partially broken away showing one form of the sub-assembly parts as they would be shipped.

In one embodiment of the invention as shown in FIG. 1 which has been chosen for the purpose of illustration, a pre-assembly or sub-assembly 10 of fastener parts consists of a bolt 11 and sleeve 12. When the pre-assembly is ultimately installed, a nut 13 is adapted to be applied to the bolt over a washer 14.

The sleeve 12 is of special construction consisting as shown of a cylindrical exterior surface 15 and a tapered passage 16 on the inside. The tapered passage provides a relatively thick wall 17 at one end of the sleeve and a relatively thin wall 18 at the opposite end. The end at the thick wall is shown squared off and the end at the thin wall is provided with an internal flare or bevel 19. Proportions are exaggerated for the purpose of illustration.

The bolt 11 consists of a head 20, a shaft 21, and a threaded end 22. There is a taper throughout the length of the shaft which is the same taper, in other words which has the same angular departure from the axis, as does the passage 16 through the sleeve. There is, however, a significant difference between the bolt and the sleeve in that the average or mean diameter of the bolt is larger than the average or mean diameter of the sleeve.

What is significant is to make sure that when all tolerances accumulate adversely in one direction the desired interference will still be assured.

What makes the device of the invention unique and already in great demand is its ability to make dimensional deviations on the individual components within the assembly of little or no consequence once the fastener is in place.

Figure 3:
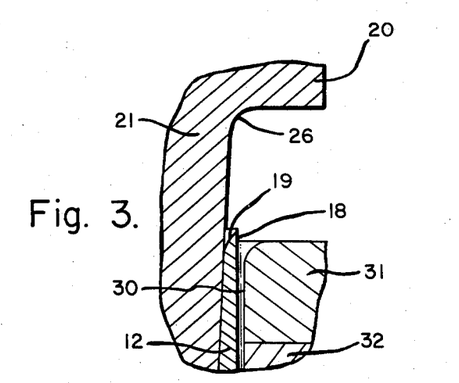
FIG. 3 is a fragmentary sectional view on the circular line 3 of FIG. 2.
Figure 5:
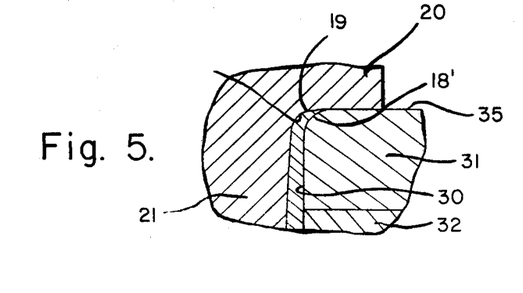
FIG. 5 is a fragmentary sectional view of the circular line 5 of FIG. 4.

It is also of consequence that there be provided a fillet 26 between the annular surface 24 of the bolt head 20 and the circumference of the shaft 21. It has been established that this location is one most subject to fatigue in devices experiencing vibration conditions of fasteners of this kind and that it is important to provide such a fillet as reinforcement to make the fastener uniformly resistant to fatigue at all locations. The fillet additionally serves to form the flange as shown in FIGS. 3 and 5 and to cold work the base of the countersink shown in FIGS. 15, 16 and 18.

When the fastener of FIG. 1 is to be installed in a hole or bore 30 which extends through four layers 31, 32, 33, and 34 of metal sheets, the sub-assembly of FIG. 1 is inserted from the face 35 of the stack-up. Clearance between the cylindrical exterior surface 15 and the sleeve 12 is exaggerated in FIG. 2 but it should be kept in mind that the clearance required to enable the sub-assembly to be readily slid into the bore is a clearance of about 0.001 inch. Since the dimensional tolerance of the bore is normally about 0.002 inch the aggregate clearance which is likely to be encountered under the condition of greatest tolerance is about 0.003 inch per inch of diameter.

Different expedients may be employed to expand the sleeve enough to have it frictionally engage the wall of the hole until the interfering expansion can be started.

Figure 4:
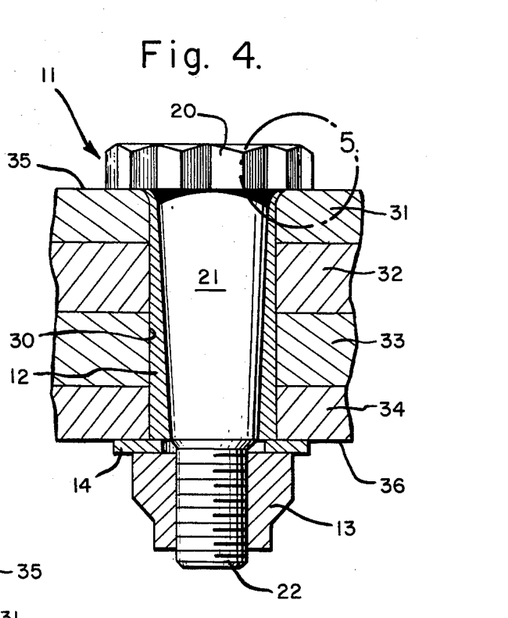
FIG. 4 is a longitudinal sectional view of the form of device of FIG. 1.

When there is a wrench hold on the head as in FIGS. 1 and 4 the head can be held non-rotatable while the nut 13 is threadedly engaged against the washer and the sleeve, drawing the tapered bolt into the sleeve to expand the sleeve.

When there is no wrench hold on the head the head can be tapped with a bucking bar to expand the sleeve.

There is, however, occasions when the partly expanded outside diameter of the sleeve is too large for the hole in which it is to be inserted. The diameter can be reduced by withdrawing the bolt from the sleeve for a limited distance. When this is done the energy built up in the sleeve will cause it to retract.

Figure 20:
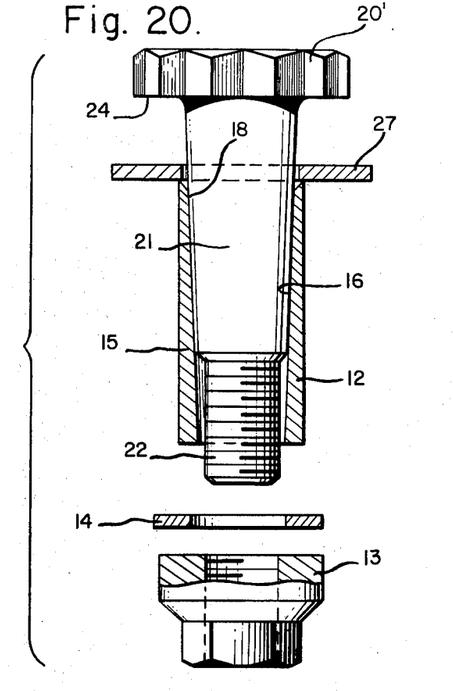
FIGS. 20 and 21 are longitudinal sectional views of a sub-assembly in general like that of FIGS. 1 through 4 showing an expedient for adjusting the initial outside diameter size of the sleeve.
Figure 21:
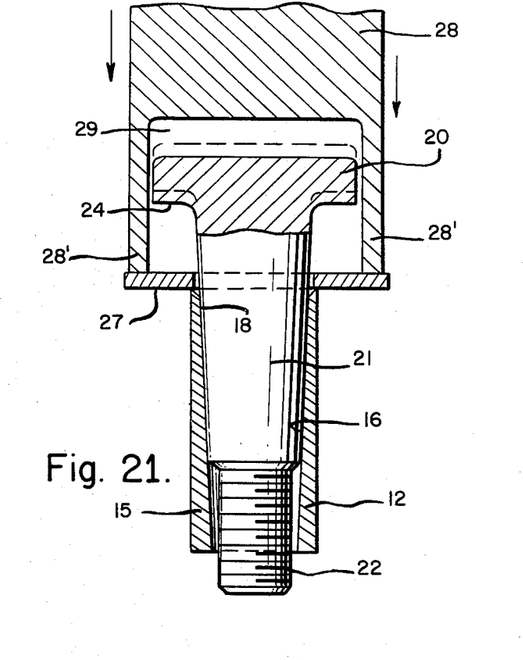

FIGS. 20 and 21 show a way in which the bolt can be withdrawn. In this arrangement a washer 27 is supplied at a location between the head 20' of the bolt and the thin end 18 of the sleeve. To push the sleeve outwardly away from the head 20' a tool 28 having a skirt 28' and a pocket 29 is employed. The edge of the skirt 28' is pressed or driven by impact against the washer 27 in the direction of the arrows as shown in FIG. 21. The effect of this action is to drive the sleeve downwardly as shown in FIG. 21, withdrawing it from the shaft 21 a short distance. The sleeve, previously expanded, then contracts and the diameter of the exterior surface becomes smaller.

Figure 22:
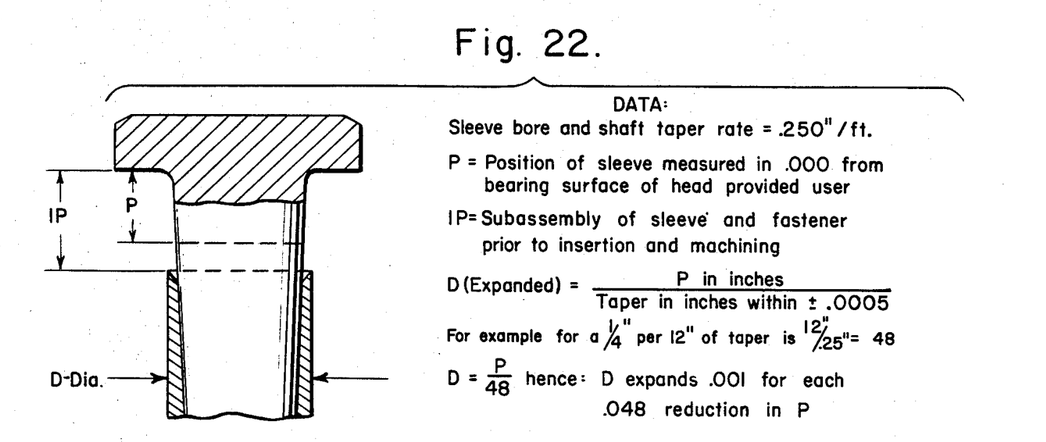
FIG. 22 shows a fragmentary longitudinal sectional view of a sub-assembly comparable to FIGS. 1 through 4 and accompanying data respecting expansion characteristics.

FIG. 22 and the accompanying legend explains in specific detail how the sleeve can be made smaller by a predetermined measured amount in precision type fasteners of the type here under consideration.

For the purpose of illustration only without any limitation intended on the use of methods, rate of taper or dimensions utilized in the invention described, the working principle and a means of attainment illustrated in FIG. 22 are further described as follows.

The relationship of diametric expansion (D-DIA) to a reduction in the dimension P is achieved by making the tapered sleeve bore smaller in average diameter than the average diameter of the fastener shaft.

The amount equal to that necessary to provide maximum contact between the shaft and bore is determined by totaling the dimensional tolerances permitted during the manufacture of the sleeve, fastener, and application of fastener coating and lubricant.

The amount of potential clearance or deviation established is converted to thousands of inches in this example by use of the $D = P/48$ relationship. The dimensional value must be added to the P dimension where it will be represented as that portion of the 1P dimension greater than P.

After insertion of the fastener shaft by hand pressure into the tapered bore, the 1P dimension is verified to be within the limits specified for the particular assembly.

The fastener shaft is now driven to a location between the middle to upper limit of the specified P dimension, expanding D just beyond the amount required. At this point of assembly manufacture the final D diameter is machined to final size while the sleeve 12 remains on the shaft 21 within tight limits.

In some forms of the invention described a small portion of the sleeve may not be in contact with the fastener shaft during final machining, in which case a compensating deviation traced from the proportionate longer portion of shaft engaged is produced on the portion of the sleeve not expanded at this point. This operation brings the entire D dimension within the proper limits throughout its length upon final assembly in the aircraft.

In the preferred form of the invention the D dimension is held within .001 inch or less in the majority of applications.

Figure 24:
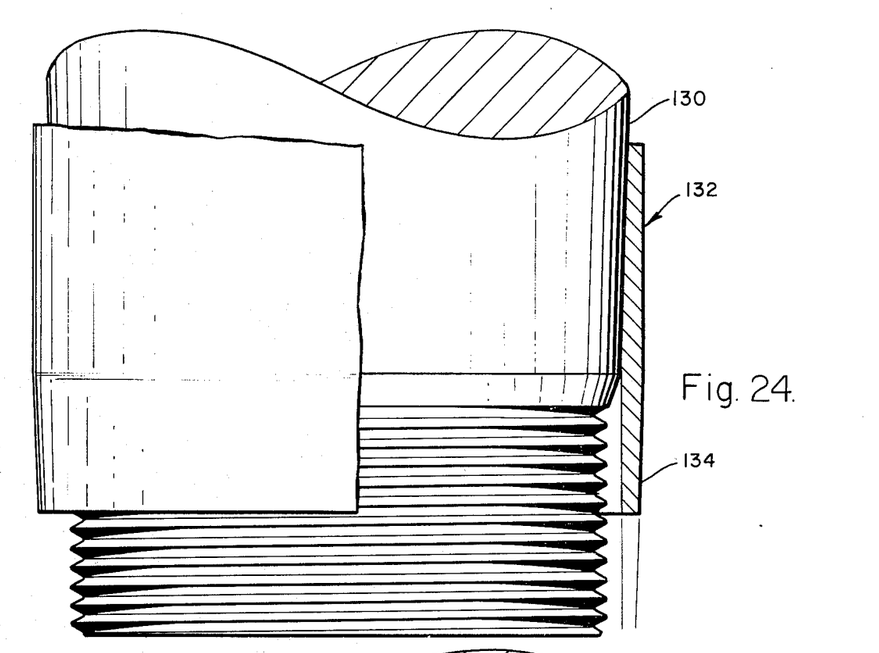
FIG. 24 is a longitudinal partial cross-section of the sleeve illustrating a first embodiment of the compensated sleeve portion.

Referring now to FIG. 24, there is shown in an enlarged illustration a partial cross-section of a first embodiment of a tapered shank 130 inserted within a sleeve member 132. The lowermost end portion 134 of the sleeve 132 has a reduced thickness in order to provide the compensation in that area of the sleeve 132 that has not been expanded by the insertion of the tapered shank 130.

In the final assembly, inserting the shank 130 will expand the lowermost portion of the shell 134 in amounts equal to the compensation by which the lowermost portion 134 of the shell has been reduced in thickness.

The external periphery portion of the shell 132 that has not been expanded contains a taper that is equal to the taper on the shank 130.

Figure 25:
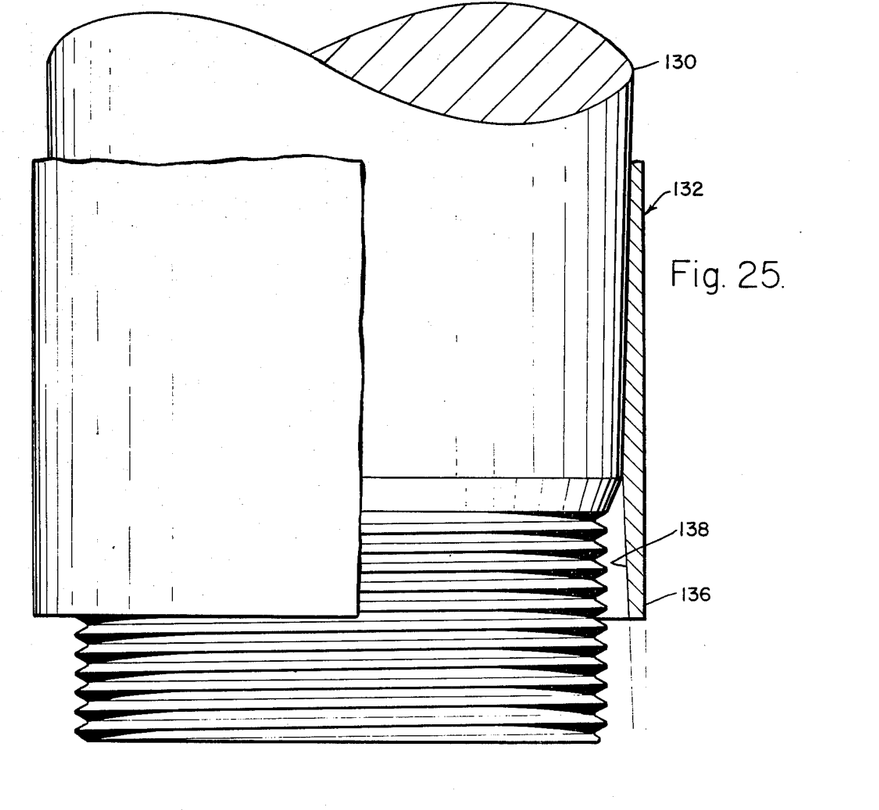
FIG. 25 is a partial longitudinal cross-section of the sleeve illustrating a second embodiment of the sleeve end portion.

Referring now to FIG. 25, there is shown a second embodiment of the compensating portion 136 of the sleeve 132. That portion of the sleeve 132 that has not been expanded by the insertion of the tapered shank 130 has been compensated by reducing the thickness of the end portion of the sleeve. The second embodiment, however, shows that the external periphery portion of the sleeve 132 has been completely cylindrical for the complete length of the sleeve, however, the inside diameter 138 of that portion of the sleeve that has not been expanded by the insertion of the tapered shank 130 has been tapered in a direction that is equal and opposite to the taper on the shank 130.

In the final assembly, inserting the shank 130 completely within the shell 132 will have the same effect in the second embodiment illustrated in FIG. 25 as that illustrated in the first embodiment of FIG. 24. Reducing the thickness of that portion of the sleeve which has not been expanded produces the basis for the compensation that brings the entire external dimension within the proper limits throughout its length upon final assembly in the aircraft.

An illustrative example of the unique advantage of the present invention is that for a ¾ inch sleeve assembly a sleeve expansion can be assured, to a prospective user, falling in a narrow range of between 1006 and 0.010 inch even in instances where the user's hole clearance is initially between 0.0 and 0.0025.

The assembly as just described is ready at this point for shipment to the user and carries a guaranteed expansion rate proportionate to the further insertion of the fastener shaft during assembly in place.

Figure 2:
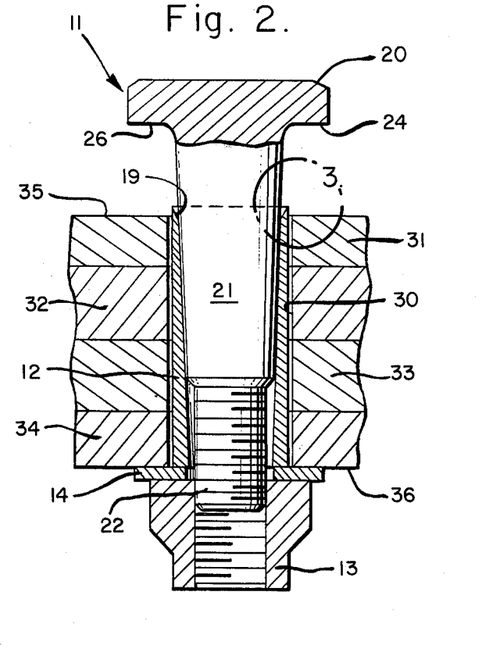
FIG. 2 is a longitudinal sectional view showing the fastener parts of FIG. 1 in place in a multi-metal stack-up.

In the form of the device of FIGS. 1 through 4 for example, the washer 14 overlies the squared off end of the sleeve as shown in FIG. 2 preventing the sleeve from shifting while the shaft 21 is forced into a passage 16 progressively spreading all portions of the sleeve uniformly outwardly into engagement with the wall of the bore 30, whereby to exert pressure against the material of the sheets 31, 32, 33, and 34 in the example shown.

The spreading of the sleeve 12 may be caluclated for all circumstances as sufficient to generate pressure outwardly in the material of the sheets in a range between about that approaching the elastic limit and rupture point. Various conditions and circumstances, however, may be such as to suggest an adequate pressure as being less than the elastic limit of the material surrounding the bore.

With the washer 14 in place against the end of the sleeve, as this spreading takes place the bevel 19 of the sleeve will be forced around the fillet 26 of the bolt to the position shown in FIGS. 4 and 5. Compressed as shown, the small end of the sleeve flares outwardly and culminates ultimately in a point 18'.

After the bolt 11 and sleeve 12 have been fully expanded into the bore 30, the washer 14 can be removed after temporary removal of the nut 13 and the nut then tightened into the position shown in FIG. 4 against a face 36 of the stack-up. The installation made reference to assumes full thickness of all of the layers 31, 32, 33, and 34 and that the length of the sleeve will be more or less the same as the total aggregate thickness of the layers.

Occasions do occur when the aggregate thickness of the layers 31, 32, 33, and 34 is on the thin side which would make the sleeve measurably longer than the full length of the bore 30. Under such circumstances, a counter bore nut or washer to be described later would accommodate the adjacent protruding end of the sleeve allowing it to bear against the bottom of the clearance before expanding the sleeve by the action heretofore described.

Figure 6:
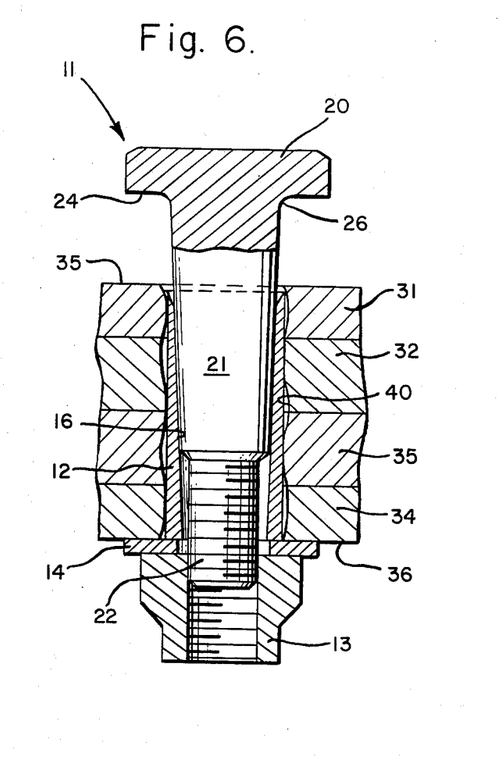
FIG. 6 is a longitudinal sectional view of the fastener applied to an irregular hole prior to tightening.
Figure 7:
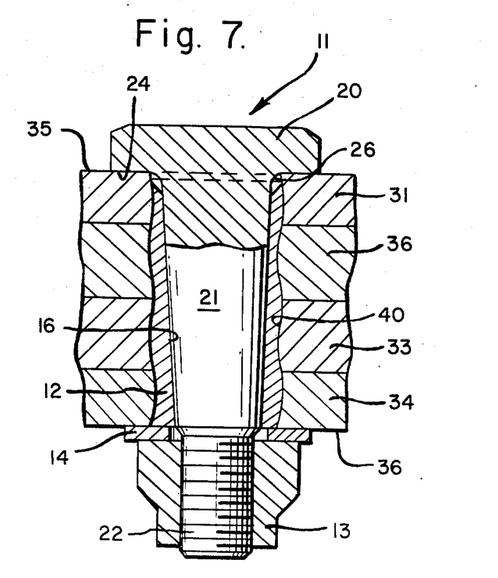
FIG. 7 is a longitudinal sectional view similar to FIG. 6 of the fastener on completion of the installation.

In the installation shown in FIGS. 6 and 7 the same fastener is shown applied to sheets 31, 32, 33, and 34 wherein a bore 40 through the sheets 31, 32, 33, and 34 is of irregular shape and diameter due to various reasons which might be either faulty drilling or an improperly dimensioned drill bit, or some other reason which would result in an irregular bore. Under the circumstances, it could conceivably occur in drilling a bore through metal sheets such as aluminum. Under such circumstances, especially where the sleeve 12 is of relatively soft material, the cylindrical exterior surface 15 of the sleeve will be distorted and the sleeve expanded to various degrees as pictured in FIG. 7 so as to fill the irregularities of the bore 40.

Figure 8:
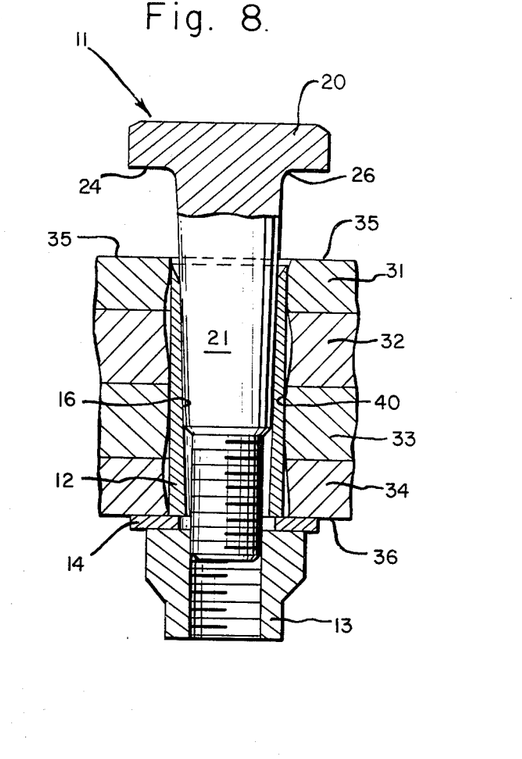
FIG. 8 is a longitudinal sectional view of the fastener of the type of FIG. 6 wherein the material of the fastener sleeve is harder than the material of the stack-up.
Figure 9:
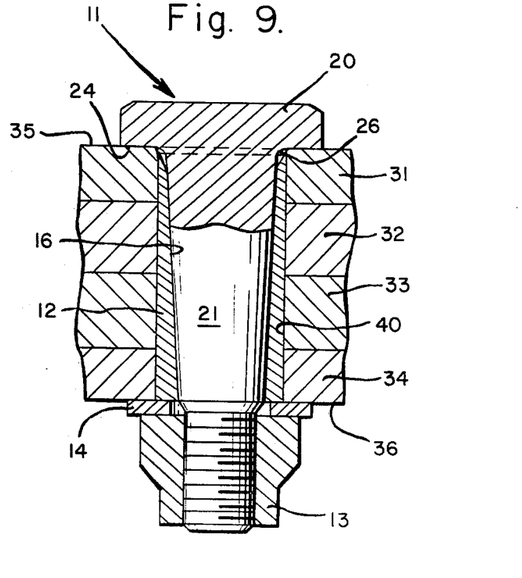
FIG. 9 is a longitudinal sectional view similar to FIG. 8 but on completion of the installation.

Under still different circumstances as shown in FIGS. 8 and 9, where comparable irregularities are shown existing in the bore 40, the material of the sleeve 12 may be selected as of a hardness appreciably greater than that of the sheets 31, 32, 33, and 34. The ultimate result in a relationship of this kind is for the sleeve 12 to expand uniformly and, because of it being harder material, the sleeve will not itself deform but will straighten out irregularities in the bore 40 throughout the length of the bore between the surface 35 and surface 36 of the stack-up.

Figure 10:
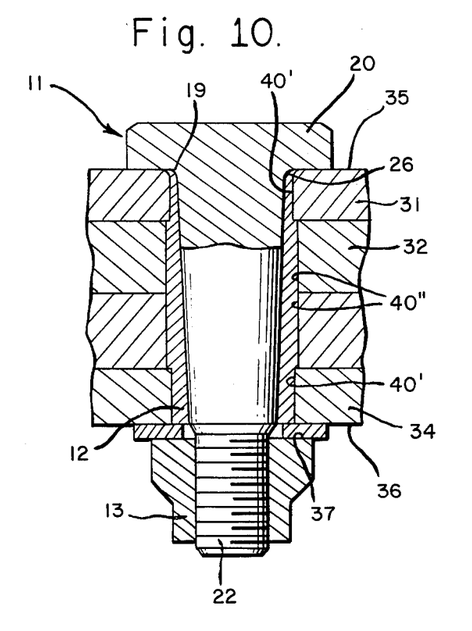
FIG. 10 is a longitudinal sectional view similar to FIG. 8 but wherein the metals of the stack-up are of different kinds and degrees of hardness, showing the joint made up.

When somewhat different conditions prevail as for example those illustrated in FIG. 10, a sleeve 12 which is relatively soft will deform variously. For example, as there pictured, the layer 31 and layer 34 are assumed to be of titanium and the layers 32 and 33 of aluminum. When the sleeve expands in the manner heretofore described, that portion 40' of the bore which extends through the titanium layers will inhibit undue deformation of the sleeve whereas those portions of the bore 40' which extend through the aluminum layers will be less resistant to deformation of the sleeve 12. As a result there will be a tendency for such portions of the bore to expand slightly as the adjacent portion of the sleeve is expanded against them producing, as shown, a somewhat distorted exterior for the sleeve, which has been exaggerated for the purpose of explanation.

Figure 11:
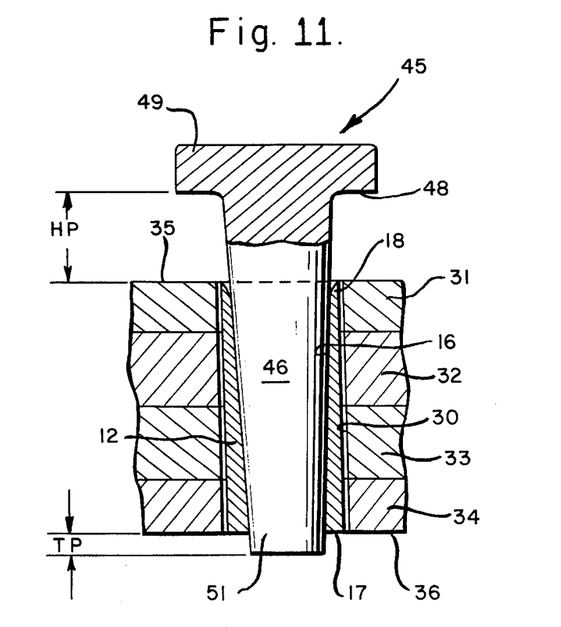
FIG. 11 is a longitudinal section of the fastener set up as a rivet installation prior to tightening in place.
Figure 12:
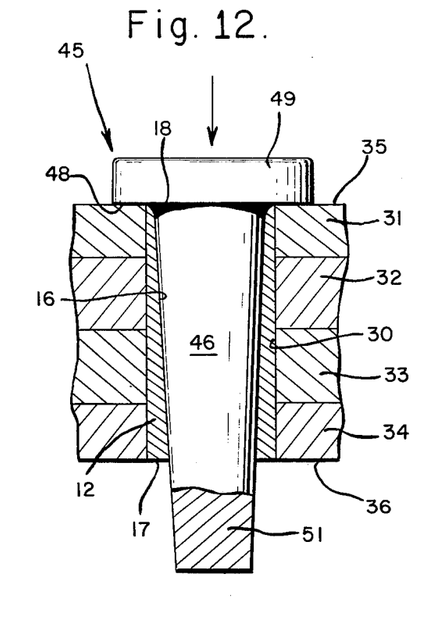
FIG. 12 is a longitudinal section similar to FIG. 10 showing the rivet in fully expanded position.
Figure 13:
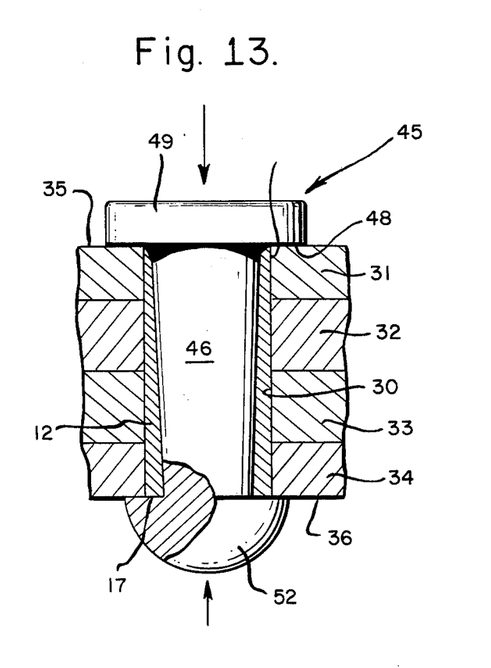
FIG. 13 is longitudinal sectional view of the fasteners of FIGS. 11 and 12 showing a rivet head formed in place.

When the fastener is to be set up in the form of a rivet such as that pictured in FIGS. 11, 12 and 13, a rivet 45 will have substantially the same proportion as does the bolt 11 and the sleeve will be the same as that previously described. For example, the rivet 45 has a shaft 46 of substantially the same taper as the passage 16 of the sleeve 12 with the shaft being of larger diameter than the passage by substantially the same amount as has been described for the shaft 21 of the bolt 11. Under such circumstances, the rivet and sleeve can be put together as a sub-assembly with an initial axial assembly pressure between the two whereby to provide an exposure HP between a surface area 48 of the head 49 and the thin wall 18 of the sleeve. This is a fixed selected dimension.

Here again, the sub-assembly may be initially driven into the bore 30 as shown in FIG. 12 until the annular surface area 48 bears against the face 35 of the stack-up. During this operation a bucking bar is usually held against the sleeve to be certain that the sleeve remains within the bore 30 while the shaft 46 is expanded into engagement with the wall of the passage 16. After this operation has been completed, and with a bucking bar against the head 49 of the rivet, an exposed end section 51 is formed into a head 52 as shown in FIG. 13.

In many applications, a bucking bar is used in the form of invention of FIGS. 1 and 2 for initial expansion of the sleeve 12 by the shaft 21 of the bolt 11, in lieu of using the nut 13, in which case the head need not include a wrenching means, after which the nut 13 can be applied for permanent installation.

In the form of invention of FIGS. 14 through 19 inclusive, a sub-assembly 55 consists of a sleeve 12' and a bolt 56. In this instance, the bolt has a customary shaft 57 but a flared half round head 58 which provides a secondary taper 59. For the subassembly to have the form shown in FIG. 14, the bolt is drawn initially partially into a passage 16 of the sleeve 12 sufficient to start a flare 60 at the thin end of the sleeve. A wrench hold like a hexagonal socket 68 in the shaft 57 is of special advantage. This expedient also lightens the weight.

Figure 15:
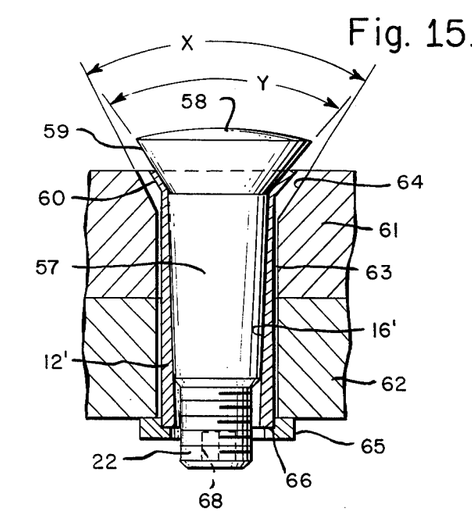
FIG. 15 is a longitudinal sectional view of the subassembly of FIG. 14 in initially inserted position in holes through a metal stack-up.

Under this set of conditions also sheets 61 and 62 are provided with a bore 63 but at the end of the bore 63 in the sheet 62 there is provided a countersink 64 which is substantially, but not completely, complementary to the angle of the taper 59 and flare 60. As shown in FIG. 15, the angle Y of the taper 59 is slightly larger than the angle of the countersink 64. In the example shown it can be assumed that the angle X is about 99° and the angle Y is about 102°, making a 3° difference. It is only the difference in angular relationship, however, which is significant in that bolts of this character may have an angle Y at the head of 82°, 70°, 60° etc. depending upon various factors such as the hardness of the material, required bearing amount of countersnk desired, amount of half round protrusion permissible, and other conventional factors.

Further, although an angular difference of 3° has been disclosed, it will be understood that this precise difference in angle is not critical and that slight variations of either greater or less may fit certain circumstances to better advantage where the flare angle differs. The objective under all circumstances is to provide an ultimate interference fit or surface compression between the thin end of the sleeve 12' at the flare 60 and the countersink 64 in addition to the interference fit between the exterior surface 15' of the sleeve 12' and the bore 63.

Figure 14:
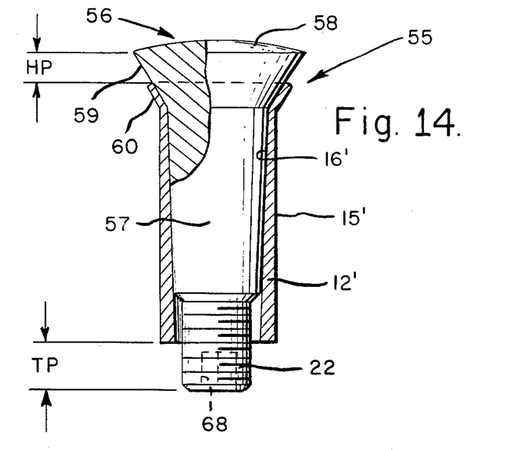
FIG. 14 is a longitudinal sectional view of a subassembly of another form of the fastener.
Figure 16:
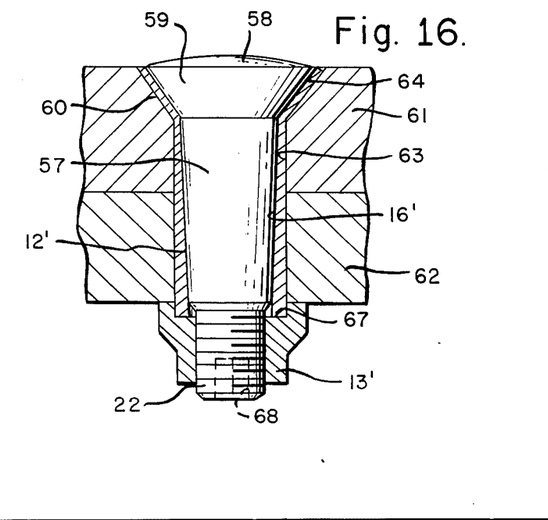
FIG. 16 is a longitudinal sectional view similar to FIG. 15 showing the completed installation in the stack-up.

In the situation portrayed in FIGS. 14, 15, and 16 for example, the sleeve is assumed to be too long for the length of the bore 63 due to the sheets 61 and 62 being slightly undersize. To accommodate this, a counterbore washer 65 is made use of, providing a counterbore 66 for reception of the protruding end of the sleeve 12'.

For this same condition, the nut 13' is made use of which has a counterbore 67 to accommodate the protruding end of the sleeve 12'. The washer may be left in place if desired.

The flare on the sleeve on some occasions may extend to the widest part of the head 58, as would be the case with a sleeve of hard material. The partially formed flare 60 of FIG. 14 presumes a more readily formable material.

Figure 17:
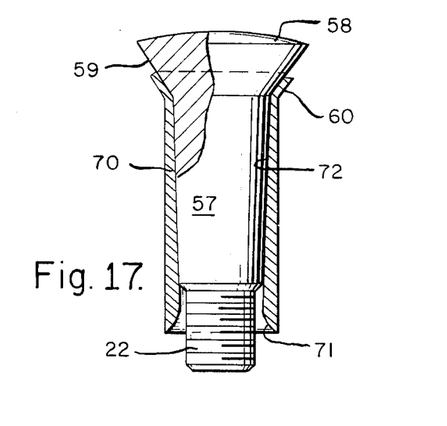
FIG. 17 is a longitudinal sectional view of a subassembly using another form of sleeve.
Figure 18:
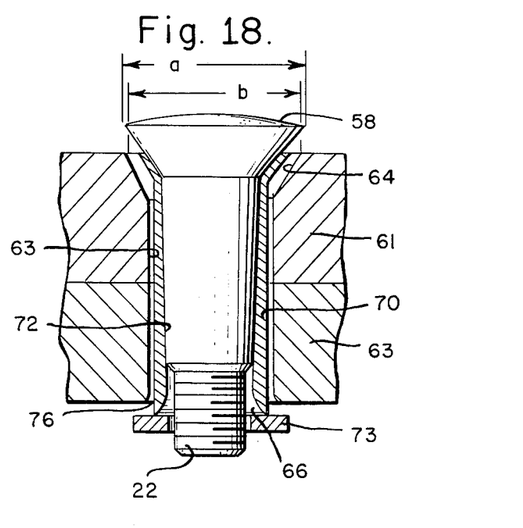
FIG. 18 is a longitudinal sectional view showing initial installation of the sub-assembly of FIG. 17.
Figure 19:
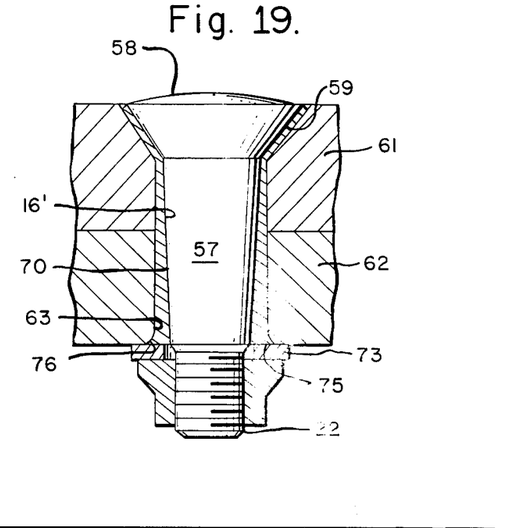
FIG. 19 is a view similar of FIG. 18 but showing the final assembly completely installed.

For special circumstances, as for example where a sealed connection may be requisite, a sleeve 70 of the type shown in FIGS. 17, 18, and 19 may be preferred. The sleeve there shown has a flared recess 71 at the thick end of the sleeve which makes a smooth transition from the passage 72. An additional expedient resides in providing the countersink 64 with a large dimension head slightly smaller than the dimension A of the largest end of the head 58. This is usually installed with a bucking bar and rivet gun.

For initially drawing the sub-assembly into engagement with the bore 63, a counterbore washer 65 as shown in FIG. 15 with the counterbore 66 may be employed. To give the sleeve 70 its final form, a washer 73 is used. This washer may, if desired, have an annular flare (not shown), the purpose of which is to work the thick end of the sleeve 70 outwardly into a flare 75 which overlies a correspondingly flared countersink 76 in the layer 62.

Figure 23:
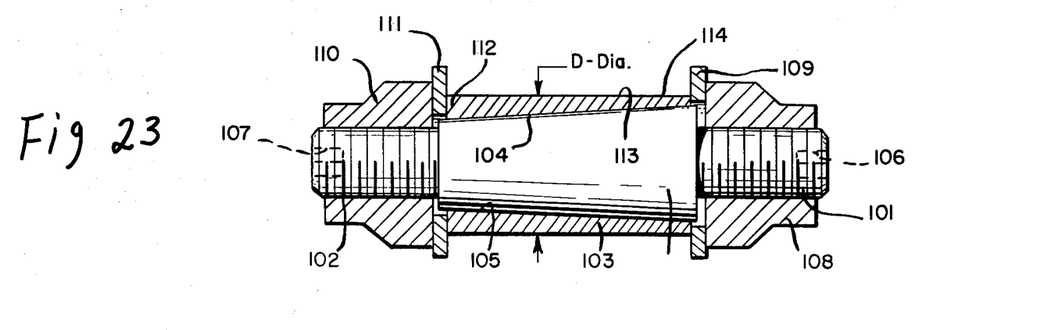
FIG. 23 is a longitudinal sectional view of still another form of the invention having a greater adjustment capability.

In the form of device shown in FIG. 23 a stud 100 having two threaded ends 101 and 102 is made use of. The stud is shown assembled with a sleeve 103 which has a tapered passage 104 matching the taper of the exterior surface 105 of the stud. A wrench socket 106 is provided at the threaded end 100 and a comparable wrench socket 107 is provided at the threaded end 102.

There is a nut 108 at the threaded end 101 bearing against a washer 109. A nut 110 at the opposite end bears against a washer 111.

When the assembly is made up the stud 100 is forced a specified distance into the tapered passage 104 of the sleeve by rotating the nut 110 against the washer 111 and the washer 111 against the thick end 112 of the sleeve 103.

Should it be found that the D diameter of the cylindrical exterior surface 113 of the sleeve is too large for the hole in which the fastener is to be inserted the diameter can be reduced by loosening the nut 110 and then tightening the nut 108. The effect of this is to press the washer 109 against the thin end 114 of the sleeve, the effect of which is to withdraw the stud a short distance out of the tapered passage 104. By reason of the fact that the sleeve had been initially expanded the sleeve will then contract so that the diameter of the exterior surface 113 then becomes smaller, and in the example suggested, smaller by an amount sufficient to permit it to fit into the hole which has been encountered.

What is of exceptional significance in all forms of the invention is that the shaft is always made of precisely the same taper and diameter. This applies equally well whether it be the shaft of the bolt of FIGS. 1 through 4, the shaft of the rivet of FIGS. 11, 12, and 13, the shaft of the tapered head bolt of FIGS. 14 through 19 or the shaft of the stud 100.

When for example it becomes necessary for any reason, whether in the shop or in the field, to replace the fastener originally installed, this can be done by first removing the fastener and then replacing it with a new fastener. In actual practice it is invariably necessary after removing the fastener initially installed to ream the hole to an oversize inside diameter. This may be an enlargement of 1/64 inch if it be the first replacement or 1/32 inch if it be the second replacement.

A replacement fitting then must have a sleeve of slightly greater thickness for the first replacement, enough so that the exterior surface has a diameter 1/64 greater than the initially installed sleeve. Precisely the same standard bolt however is usable with the sleeve of greater thickness, namely, the replacement sleeve. In other respects the replacement assembly is the same in all respects as has been described for the initially installed fastener.

When there is to be a second replacement all that is needed is to provide a new second replacement sleeve of even greater thickness, namely, a thickness sufficient to provide an exterior cylindrical surface which is 1/32 inch greater in diameter than the diameter of the initially installed sleeve, and still use the standard bolt. In the replacement sleeve last described as in the first described replacement sleeve the tapered passage 16 through the sleeve remains of precisely the same size as the passage 16 for example, described in connection with the assembly of FIG. 1 Naturally therefore the standard bolt, rivet, or stud fits both replacement sleeves and three need never be employed or stocked any type of bolt, rivet, or stud other than standard. Consequently, replacements can readily be made just as well in remote field installations as in the factory itself.

On other occasions when there is occasion to straighten out a hole or cold work a hole in preparation for insertion of a reception of a bolt or shaft of some specified size, the form of the invention of FIG. 23 can be used for that purpose and then removed. In that event the sleeve needs to be of a material harder than the material in which the hole is drilled.

Having described in the invention, what is claimed as new in support of Letters Patent is as follows:

1. A pre-assembled device for use with multiple layers of material having axially aligned holes extending through the layers of material comprising,
   a fastener comprising a sleeve and a fastening means,
   said sleeve being circumferentially continuous and having a substantially cylindrical exterior throughout its length and a gently tapered bore through the sleeve,
   said fastening means comprising a shaft with a head element at one end and clamping means at the other end,
   said head element having a circumferentially continuous annular bearing area extending in a direction transverse to the axis of the shaft,
   the outside of said shaft having a gentle taper varying from a size adjacent the head element end relatively larger than the initial diameter of the large end of said sleeve bore to a size adjacent the opposite end relatively smaller than said large end of the sleeve bore,
   whereby there is a taper on the shaft substantially the same as the taper of said sleeve,
   an auxiliary clamping means in operable engagement with the clamping means of the other end of the shaft,
   said shaft having an initial pre-assembly condition with the sleeve with the sleeve slightly expanded,
   said shaft having a final fastening position in the sleeve wherein the head and adjacent end of the sleeve are in pressure engagement with the material adjacent one face of the multiple layers of material and the auxiliary clamping means and sleeve end adjacent thereto are in pressure engagement with the other face of multiple layers of material at the opposite side, the tapered sleeve bore being under pressure throughout its length by the tapered exterior of the shaft, said sleeve being in expanded condition throughout a portion of its length in an amount that overcomes the aggregate of maximum permissible tolerance of the cylindrical hole plus an amount of not less than 0.002 inches per inch providing interfering engagement outwardly with the wall of the cylindrical hole, the exterior diameter of said sleeve reformed substantially cylindrical after being expanded, a section of the end of the sleeve adjacent the small end of the sleeve bores in initial pre-assembly condition has a reduced thickness compensating deviation in the tapered wall thickness corresponding to an adjusted wall thickness of the balance of the sleeve when in said pre-assembly condition, said reduced thickness having the same taper as said first and said sleeve, whereby the exterior of said sleeve in final expanded condition is uniformly cylindrical through its entire length of said cylindrical hole.

2. A fastener device for holding together multiple layers of material wherein there is a cylindrical hole having a cylindrical wall and comprising substantially axially aligned holes extending through the layers of material, said fastener device comprising a pre-assembly including a circumferentially continuous sleeve and a fastening means, said sleeve having outer and inner surfaces, one of said surfaces comprising a sleeve bore and one of said surfaces being cylindrical throughout its length, the exterior of said sleeve having a size adapted to provide an initial sliding fit in said hole, said fastening means comprising a shaft with a head at one end and a fastener portion at the opposite end with clamping means thereon, said head having a circumferentially continuous annular bearing area, the outside diameter of the shaft between the head and said fastener portion comprising a gentle tapered portion varying from a size adjacent the head relatively larger than the initial diameter of the adjacent end of said bore to a size at the opposite end smaller than said adjacent end of said bore, said shaft having a pre-assembled press fit in the bore with the sleeve partially expanded sufficient to close maximum allowable tolerances between the interior surface of the sleeve and the tapered portion of the shaft and with part of the tapered portion of the shaft adjacent the head exposed, part of the fastener portion being exposed and part of the fastener portion being located within the bore, said sleeve having a varying wall thickness which is smallest at the end adjacent the head of the fastening means and which expands progressively toward the other end, the rate of expansion being substantially uniform throughout the length of the sleeve, a first portion of the sleeve surrounding the tapered portion of the shaft in pre-assembled press fit condition having a final reduced cylindrical shape and the second portion of the wall of the sleeve which initially surrounds the fastener portion being in position deflected inward from the cylindrical shape but having a reduced compensating thickness whereby to provide expansion of said second portion to a position wherein the exterior thereof is cylindrical and alignment with the cylindrical first portion of the sleeve.

3. A sleeve bolt assembly for both a tension and shear fatique critical joint comprising multiple layers of material of different hardness, yield strength, and modulus of elasticity wherein there is a common substantially cylindrical hole as long as the aggregate thickness of said layers which is the aggregate of substantially axially aligned individual holes extending through the layers of material, and wherein the capability is an interference fit of the sleeve bolt assembly in the cylindrical hole of between about 0.002 inc. and 0.025 inc. per inch diameter, said sleeve bolt assembly comprising a pre-assembly of a bolt and a circumferentially continuous sleeve, said bolt comprising a shaft having a head at one end and a thread at the opposite end, said head having a circumferentially continuous annular bearing area transverse to the bolt axis, a portion of the shaft having a gentle taper of between 0.200 to 0.300 in. per foot of length, said sleeve having a tapered bore corresponding to the taper of the shaft, an exterior portion substantially cylindrical throughout its length except for a reduced thickness compensating portion which overlies the threads, said reduced thickness having the same taper as said shaft and said sleeve, a hardness different from the hardness of at least one of said layers, and a length substantially equal to the length of the cylindrical hole, the diameter of a first portion of the shaft adjacent the head being larger than the diameter of the large end of the bore when the shaft is drawn into the bore a distance of about 0.096 in. to an initial partially expanded condition wherein the sleeve is expanded in an amount exceeding the maximum tolerance of the sleeve fit with the shaft, the length of the tapered portion of the shaft being substantially equal to the length of the sleeve, the exterior of the sleeve when in initial partially expanded condition on the shaft having a reformed cylindrical exterior portion of reduced diameter less than the initially expanded diameter and adapted to provide a sliding fit in said cylindrical hole, and means adapted to engage the thread on the shaft and draw said shaft into the bore until the head is in a position adjacent the corresponding end of the sleeve and the sleeve is in final expanded condition to create the required interference fit and joint clamp-up simultaneously with seating of the head, a portion of the shaft between the head and the adjacent end of the sleeve being exposed when in said initial partially expanded condition and adapted to provide a sleeve with an exterior in said final expanded condition cylindrical throughout its length and having a diameter expanded in size by an amount of between 0.002 in. and 0.025 in. per inch diameter of the shaft within a tolerance of ±0.0005 throughout the entire length of the sleeve.

4. A sleeve bolt assembly as in claim 3 wherein a part of the sleeve length in said initially partially expanded condition overlies the threads of the shaft in an inwardly deflected condition and has a diminished compensating wall thickness.

5. A sleeve bolt assembly as in claim 3 wherein the length of the sleeve is the same or greater than the length of said cylindrical hole in layers of material wherein the outer layers of material are the same or softer.

6. A sleeve bolt assembly as in claim 3 wherein the nut has an annular recess on the side facing the sleeve adjusted to a breadth and depth receptive of the adjacent end of the sleeve.

7. A sleeve bolt assembly as in claim 3 wherein the length of the sleeve is the same or less than the length of the cylindrical hole where the outer layers of material are the harder layers.

8. A sleeve bolt assembly as in claim 3 wherein the cylindrical hole is oversize and the sleeve has an oversize wall thickness to compensate for the oversize hole.

9. A sleeve bolt assembly as in claim 3 wherein there is a wrench hold on one end of the bolt.

10. A sleeve bolt assembly as in claim 3 wherein there is a countersink recess at the end of the cylindrical hole adjacent the head and the head has a complementary countersink portion.

11. A sleeve bolt assembly as in claim 3 wherein the shaft has threads at both ends and the head is a nut in engagement with the respective threads.

12. A sleeve bolt assembly as in claim 3 wherein the nut which serves as the head has an annular recess on the side facing the sleeve adapted to receive the respective end of the sleeve.

13. A high strength fastener device for holding together multiple layers of materials through an aligned hole comprising,
   a two-piece pre-assembly including a circumferential continuous metallic sleeve and a metallic fastening means,
   said sleeve having outer and inner surfaces, said inner surface comprising a sleeve bore being uniformly tapered and said outer surface being cylindrical throughout the greater of its length,
   the exterior of said sleeve having a size adapted to provide an initial sliding fit into said hole,
   said head having a substantially radially extending, circumferentially continuous annular bearing formed to said shaft by an annular fillet portion,
   the outside diameter of the shaft between said fillet portion and said holding portion comprising a tapered portion varying uniformly in diameter from a large size adjacent to said head relatively larger than the largest diameter of the sleeve bore, which is at the adjacent end of said bore, to a smaller size at the opposite end adjacent said sleeve bore,
   the taper on the shaft being substantially the same as the taper of the sleeve bore,
   said shaft having a pre-assembled pressed fit in the bore with the sleeve partially expanded radially sufficient to remove all tolerances between the tapered outside diameter of the shaft and the tapered inside diameter of said sleeve,
   the length of said sleeve being less than the combined length of said tapered portion and said holding portion of the shaft with a first part of the holding portion extending beyond the other end of the sleeve, and a second part of the holding portion being located within the sleeve bore,
   The holding portion having a diameter less than the smallest diameter of said tapered sleeve whereby the portion of the sleeve overlying the holding portion is not expanded,
   the expansion of the sleeve over the tapered portion of the shaft is linear throughout the length of the sleeve, the first portion of the sleeve surrounding the tapered portion of the shaft in pre-assembled pressed fit condition having a final cylindrical exterior which has been reduced in diameter after pre-assembly,
   and a second portion of the sleeve surrounding a part of the holding portion having a wall which has been reformed to define a reduced compensating thickness having a taper substantially equal to the taper on said shaft and said sleeve for the unexpanded portion of the sleeve, whereby to provide expansion of said second portion to a position wherein the exterior diameter is cylindrical and in alignment with the cylindrical first portion of the sleeve when the sleeve is fully expanded.

14. A high strength fastener device according to claim 13 in which said sleeve has an internal bevel at the end thereof of largest internal diameter.

15. A high strength fastener device according to claim 13 in which said holding means is a threaded portion and has a major diameter less than the smallest diameter of said tapered sleeve.

16. A high strength fastener device according to claim 13 in which said enlarged head comprises wrench holding means thereon.

17. A high strength fastener device according to claim 13 in which the outside diameter of the second portion of the sleeve is reduced to an external diameter less than the external diameter of said first portion of the sleeve.

18. In a two piece high strength fastener consisting of a partially assembled tapered shaft and internally tapered hollow cylindrical sleeve, the shaft having a tapered shank with a maximum diameter at one end, the hollow cylindrical sleeve having a given outside diameter and a tapered inside diameter defining a maximum diameter at one end that is less than the maximum diameter on said tapered shank, said taper on said shank being substantially equal to said taper on said sleeve, the sleeve being inserted over the tapered shank and positioned a given distance with that portion of sleeve contacting said tapered shank being radially expanded, and the outside diameter of the expanded sleeve being reduced to a given cylindrical dimension, the improvement comprising:
   a further reduced thickness of said tapered sleeve not contacted by said tapered shank to provide a compensating thickness for the unexpanded portion of the sleeve when the sleeve is fully expanded, said further reduced thickness having the same taper as on said tapered sleeve and on said tapered shaft.

19. In a two piece fastener according to claim 18 in which the external diameter of said sleeve not contacted by said tapered shank is reduced to provide the necessary compensation when expanded.

20. In a two piece fastener according to claim 18 in which the taper of the shank and the sleeve is between 0.12 inch and 0.50 inch per foot.

21. In a two piece fastener according to claim 18 which includes a head defining a shoulder formed to said tapered shank by an annular fillet portion.

22. In a two piece high strength fastener consisting of a partially assembled tapered shaft and internally tapered hollow cylindrical sleeve, the shaft having a tapered shank with a maximum diameter at one end, the hollow cylindrical sleeve having a given outside diameter and a tapered inside diameter defining a maximum diameter at one end that is less than the maximum diameter on said tapered shank, said taper on said shank being substantially equal to said taper on said sleeve, the sleeve being inserted over the tapered shank and positioned a given distance to radially expand that portion of sleeve contacting said tapered shank, the method of compensating for the unexpanded portion of the sleeve comprising the steps of:
   reducing the outside diameter of the expanded sleeve to a given cylindrical dimension, reducing the thickness of said tapered sleeve not contacted by said tapered shank, and reducing the thickness at the same taper as on said shank and said sleeve.

23. The method as defined in claim 22 which includes the step of reducing the external diameter of the tapered sleeve not contacted by said tapered shank to provide the necessary compensation when expanded.

24. A system according to claim 18 in which only the outside diameter of that portion of the tapered sleeve not contacted by said tapered shank is reduced in diameter.

25. A system according to claim 18 in which the complete outside diameter of the sleeve which includes that portion expanded by the tapered shank and the unexpanded portion is reduced to a cylindrical diameter along its complete length, and in which only the internal diameter of that portion of the sleeve not contacted by the tapered shank is reduced in diameter.

* * * * *